(12) United States Patent
Yakhnich et al.

(10) Patent No.: US 6,907,092 B1
(45) Date of Patent: Jun. 14, 2005

(54) METHOD OF CHANNEL ORDER SELECTION AND CHANNEL ESTIMATION IN A WIRELESS COMMUNICATION SYSTEM

(75) Inventors: Evgeny Yakhnich, Hadera (IL); Ron Cohen, Ramat Hasharon (IL)

(73) Assignee: Comsys Communication & Signal Processing Ltd., Herzelia (IL)

( * ) Notice: Subject to any disclaimer, the term of this patent is extended or adjusted under 35 U.S.C. 154(b) by 652 days.

(21) Appl. No.: 09/616,161

(22) Filed: Jul. 14, 2000

(51) Int. Cl.$^7$ .................................................. H04B 1/10
(52) U.S. Cl. ...................................... 375/346; 455/67.11
(58) Field of Search ................................. 375/231, 232, 375/233, 262, 341, 346, 348, 350; 714/794, 795; 455/67.11, 67.13

(56) References Cited

U.S. PATENT DOCUMENTS

| | | | |
|---|---|---|---|
| 5,251,233 A | 10/1993 | Labedz et al. ................. | 375/12 |
| 5,479,446 A | 12/1995 | Mourot et al. ............... | 375/243 |
| 5,581,580 A * | 12/1996 | Lindbom et al. ........... | 375/340 |
| 5,596,607 A * | 1/1997 | Larsson et al. ............. | 375/340 |
| 5,787,131 A * | 7/1998 | Bottomley .................. | 375/347 |
| 5,903,610 A * | 5/1999 | Skold et al. ................. | 375/285 |
| 5,930,296 A * | 7/1999 | Kot ............................. | 375/233 |
| 6,081,566 A * | 6/2000 | Molnar et al. ............... | 375/347 |
| 6,466,616 B1 * | 10/2002 | Stenstrom et al. .......... | 375/233 |

FOREIGN PATENT DOCUMENTS

EP 0966113 12/1999 ........... H04B/7/005

* cited by examiner

Primary Examiner—Young T. Tse
(74) Attorney, Agent, or Firm—Zaretsky & Associates PC; Howard Zaretsky (57) ABSTRACT

A novel and useful apparatus for and method of determining the channel order and channel estimate in a communications system such as a wireless communication system including cellular and cordless. Such channels are typically characterized by rapidly changing impulse response and their taps can be modeled as zero-mean, complex, Gaussian random processes. A sufficiently long, initial channel estimate of length is performed so as to ensure that the actual channel taps will be contained in the estimated taps thus making certain that the equalizer will effectively eliminate intersymbol interference. Channel estimation is performed during each burst using the training sequence transmitted in the middle of the burst. The tap energies are averaged so as to track slow variations in the pattern of resultant channel taps. A noise floor is calculated using the lowest averaged taps and a threshold is computed based thereon and applied to the average taps. The channel order and the tap positions are then selected in accordance those average taps that are above the threshold.

32 Claims, 7 Drawing Sheets

METHOD OF CHANNEL ORDER SELECTION AND CHANNEL ESTIMATION IN A WIRELESS COMMUNICATION SYSTEM

FIELD OF THE INVENTION

The present invention relates generally to communication systems and more particularly relates to a method of selecting the channel order and performing channel estimation. The method is particularly useful in estimating channel order in wireless communications systems for use with channel estimation methods.

BACKGROUND OF THE INVENTION

In recent year, the world has witnessed explosive growth in the demand for wireless communications and it is predicted that this demand will increase in the future. There are already over 500 million users subscribing to cellular telephone services and the number is continually increasing. Eventually, in the not too distant future the number of cellular subscribers will exceed the number of fixed line telephone installations. Already, in many cases, the revenues from mobile services already exceeds that for fixed line services even though the amount of traffic generated through mobile phones is much less than in fixed networks.

Other related wireless technologies have experienced growth similar to that of cellular. For example, cordless telephony, two way radio trunking systems, paging (one way and two way), messaging, wireless local area networks (WLANs) and wireless local loops (WLLS).

Currently, the majority of users subscribe to digital cellular networks. Almost all new cellular handsets sold to customers are based on digital technology, typically second generation digital technology. Currently, third generation digital networks are being designed and tested which will be able to support data packet networks and much higher data rates. The first generation analog systems comprise the well known protocols AMPS, TACS, etc. The digital systems comprise GSM, TDMA (IS-136) or CDMA (IS-95), etc.

Most communication systems must combat a problem known as intersymbol Interference (ISI). Ideally, a transmitted symbol arrives at the receiver undistorted, attenuated from its original magnitude and occupying only its time interval. In reality, however, this is rarely the case and the received symbols are subject to ISI. Intersymbol interferenee occurs when one symbol is distorted sufficiently that it occupies time intervals of other symbols.

Figure 1:
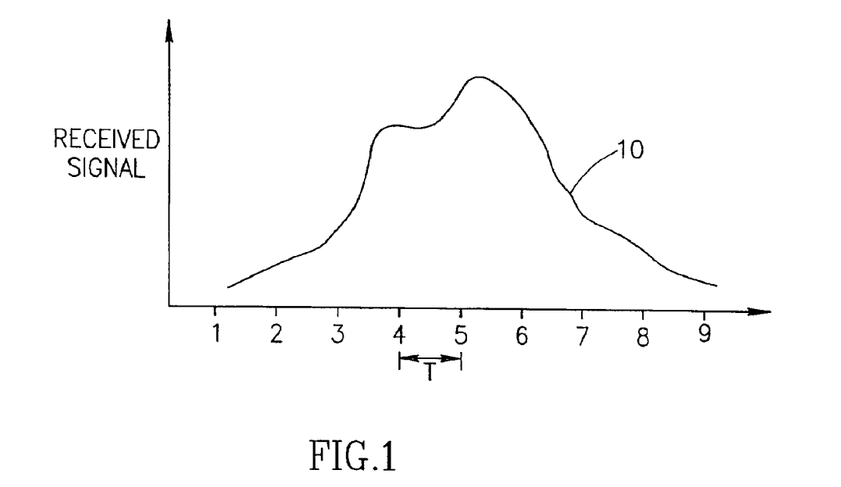
FIG. 1 is a diagram illustrating a transmitted symbol smeared across multiple symbol times due to the effects of intersymbol interference (ISI)

A diagram illustrating a transmitted symbol spread across multiple symbol times due to the effects of multipath propagation and filtering is shown in FIG. 1. The graph depicts the received channel impulse response. It illustrates the output signal strength of the channel when only one symbol was transmitted. The ticks along the x-axis define symbol duration times T. A symbol transmitted between times 4 to 5 is spread over eight symbol times.

The situation is made even worse in GSM communications systems as the GSM transmitter contributes its own ISI due to controlled and deliberate ISI from the transmitter's partial response modulator. The effects of ISI are influenced by the modulation scheme and the signaling techniques used in the radio.

When considering ISI caused by the radio channel, multipath fading is the primary component. The problem stems from the fact that the transmitted signal takes alternate paths in addition to the direct path. In some cases, there is no direct path because it is blocked. Each path is characterized by a different delay and reflection coefficient. The fading phenomenon is due to interferenee between many signal reflections each having different phases. Since the carrier frequency is typically very high in mobile radio systems, any change in the propagation channel greatly affects the interferenee pattern. This is typically observed as fast channel variations over time. It may be characterized through Doppler spread measurements. Doppler spread is caused by the relative motion between a receiver and a transmitter. Signals arrive at the receiver having different frequencies, amplitudes and phase. ISI can also be generated when a signal is passed through a filter too narrow to accommodate the bandwidth of the signal, e.g., the transmitter pulse shaping filter or receive filter. A narrow filter spreads the modulation pulses over time and the channel itself has filter like effects on the transmitted signal. With the radio channel, however, the characteristics of its filter like action vary with time.

Equalization is a well known technique used to combat intersymbol interference whereby the receiver attempts to compensate for the effects of the channel on the transmitted symbols. An equalizer attempts to determine the transmitted data from the received distorted symbols using an estimate of the channel that caused the distortions. In communications systems where ISI arises due to partial response modulation or a frequency selective channel, a maximum likelihood sequence estimation (MLSE) equalizer is optimal. This is the form of equalizer generally used in GSM systems.

The MLSE technique is a nonlinear equalization technique which is applicable when the radio channel can be modeled as a Finite Impulse Response (FIR) system. Such a FIR system requires knowledge of the channel impulse response tap values. It gets this information by using a known symbol sequence to estimate the channel impulse response. The known symbol sequences are called training sequences or sounding sequences, which the transmitter sends to the receiver at regular intervals.

There exist other equalization techniques such as Decision Feedback Equalization (DFE) or linear equalization. These equalization techniques, however, require precise knowledge of channel.

Figure 2:
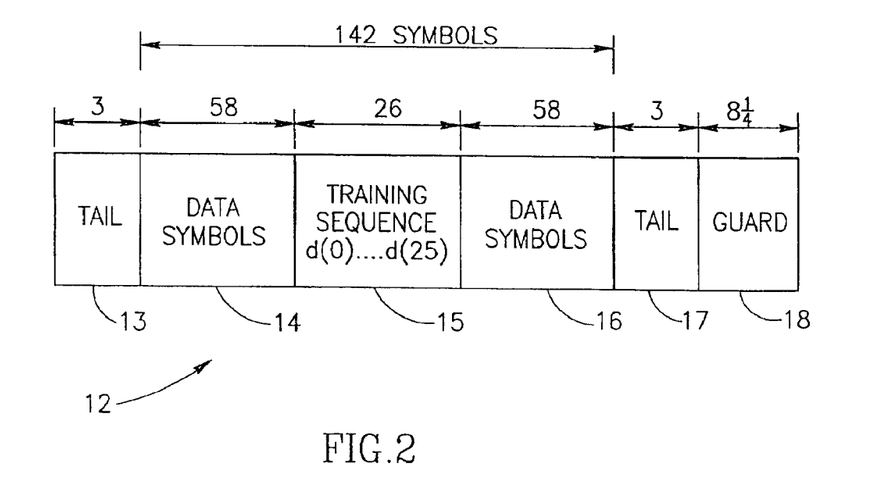
FIG. 2 is a diagram illustrating the elements of a GSM message including tail, data and training symbols.

In GSM, the training sequence is sent in the middle of each burst. As shown in FIG. 2, each fixed length burst 12 consists of 142 bits preceded by a 3 bit tail 13 and followed by a 3 bit tail 17 and 8.25 bit guard 18. The 142 bits include a 58 bit data portion 14, 26 bit training sequence 15 and another 58 bit data portion 16. Since the training sequence is sent in the middle of the burst, it is referred to as a midamble. It is inserted in the middle of the burst in order to minimize the maximum distance to a data bit thus minimizing the time varying effects at the ends of the burst.

The training sequence comprises a sequence of symbols generated so as to yield good autocorrelation properties. The receiver control algorithm uses the training sequence, received in the presence of ISI, to determine the characteristics of the channel that would have generated the symbols actually received. GSM uses eight different training sequences whereby the autocorrelation of each results in a central peak surrounded by zeros. The channel impulse response can be measured by correlating the stored training sequence with the received sequence.

The MLSE equalizer (also called a Viterbi equalizer) uses the Viterbi algorithm along with inputs and an estimate of the channel to extract the data. The equalizer generates a model of the radio transmission channel and uses this model in determining the most likely sequence. An estimate of the transfer function of the channel is required by the MLSE equalizer in order to be able to compensate for the channel ISI effect The problem of estimating the channel is made worse by the dynamic nature of the channel. The equalizer must continuously adapt to varying channel characteristics as the mobile station moves through different multipath environments. For this reason, the training sequence is included in each burst.

The MLSE equalizer operates by scanning all possible data sequences that could have been transmitted, computing the corresponding receiver input sequences, comparing them with the actual input sequences received by computing metric parameters and selects the sequence yielding the highest likelihood of being transmitted. Considering that ISI can be viewed as unintentional coding by the channel, the Viterbi algorithm used in the MLSE equalizer can be effective not only in decoding convolutional code sequences but in combating ISI. Typically, the MLSE equalizer comprises a matched filter (i.e. FIR filter) having N taps coupled to a Viterbi processor. The output of the equalizer is input to the Viterbi processor which finds the most likely data sequence transmitted.

A key constraint of the equalizer, whether the equalization technique is linear, DFE, MLSE or otherwise, is that it must have an accurate estimate of the channel in order to achieve good performance. GSM and other TDMA type communications systems provide for this by transmitting a burst comprising unknown data and a known training sequence. The purpose of the training sequence is to provide a basis for channel estimation. Several methods of channel estimation are known in the art and include, for example, a correlation method and a least squares method. The correlation method is described in detail in "GSM System Engineering," A. Mehrotra, 1997, Chapter 6 and in the article "On the Minimization of Overhead in Channel Impulse response Measurement," Y. Han, IEEE Transactions on Vehicular Technology, Vol. 47, No. 2, May 1998, pages 631–636. The least square method of channel estimation is described in more detail in the articles "Improved Channel Estimation With Side Information," A. S. Khayrallah, R. Ramesh, G. E. Bottomley, D. Koilpillai, IEEE, March 1997, pages 1049–1051 and "Impact of Blind versus Non-Blind Channel Estimation on the BER Performance of GSM Receivers," D. Boss, T. Petermann, K. Kammeyer, IEEE Signal Processing Workshop on Higher-Order Statistics, Jul. 21, 1997, pages 62–67 and in the book "Adaptive Filter Theory," S. Haykin, 1996, Chapter 11 (Method of Least Squares).

All the above methods, however, assume a known channel order which, in reality is unknown. Accurate knowledge of the channel order and channel tap coefficients yields optimum performance of the MLSE equalizer. The FIR filter used preferably is long enough to include the channel impulse response (CIR). The number of taps of the filter is important in that is relates to the number of path delays that must be equalized. Note that in the case of GSM, a number of taps N between 5 and 7 typically yields satisfactory results.

Note that the problem of determining the channel order is made worse for radio channels that are characterized by rapidly changing impulse response functions. The taps of the filters used to simulate these channels can be modeled as zero mean, complex, random processes. Thus, the CIR must be measured from burst to burst and cannot be assumed to be fixed.

One possible approach in choosing the number of taps (i.e. the channel order) is to assume a constant channel order. This approach is described in the book "GSM System Engineering," A. Mehrotra, 1997, Chapter 6. This approach, however, has a disadvantage in that when the channel is shorter than the estimated channel length, the noise floor of the receiver increases due to the selection of non-relevant taps. The non-relevant taps result in added noise that is correlated for each symbol since the channel estimate is used in determining each received symbol. Note that although there is always some error in the channel estimate, it is exaggerated when the channel length is estimated to be longer than it actually is.

Another disadvantage is that when the channel is longer than the estimated channel length some channel taps will be omitted when they should not be. In this case, the MLSE equalizer will not be able to eliminate the intersymbol interference completely since the entire channel impulse response is not modeled.

SUMMARY OF THE INVENTION

Accordingly, the present invention provides a novel and useful apparatus for and method of determining the channel order and channel estimate in a communications system. The present invention is suitable for use with a wide range of channels and is particular useful in estimating wireless channels such as GSM and other types of cellular channels. These types of channels are typically characterized by rapidly changing impulse response and their taps can be modeled as zero-mean, complex, Gaussian random processes. A typically application of the resulting channel order and channel estimate provided by the present invention is with performing maximum likelihood sequence estimation in Viterbi equalizers. Viterbi equalizers are commonly used in both wireless and wired communication systems and are particularly effective at combating ISI in many types of wireless channels such as cellular.

To aid in illustrating the principles of the present invention, the apparatus and method are presented in the context of a GSM mobile station. It is not intended that the scope of the invention be limited to the examples presented herein. One skilled in the art can apply the principles of the present invention to numerous other types of communication systems as well.

The method of the present invention is intended to operate with bounded length channels having relatively slowly varying tap delay patterns. Note that in the case of a wireless channel, this equates to a slowly varying pattern of reflectors even though the magnitude and phase of the reflectors may change rapidly. It is noted that each RF path suffers fading and delays independently of each other. The channel estimate taps are related almost one to one with the different paths since they are independent of one another. Thus, the amplitude, phase and delay of the channel must be estimated in order for the equalizer to be able to remove the ISI. In actuality, the delay changes relatively slowly, the amplitude and phase, however, change rapidly.

The operation of the invention is based on selecting those taps having a larger energy than the energy of the tap estimation error. This is achieved by generating a sufficiently long, initial channel estimate followed by tap energy averaging with leakage. In accordance with the invention, the energy (rather than the amplitude) of the taps is averaged. This is critical in the case of complex channels with zero-mean taps. The initial long channel estimate enables an accurate channel order selection.

The invention provides the following advantages and benefits. First, the performance of the equalizer, especially an MLSE based one, is enhanced by selecting the appropriate channel order. Second, the invention is well suited for random, zero-mean time varying channels such as wireless channels having blocked line of sight, including cellular, cordless, etc. Third, the invention is well suited for random, non zero-mean time varying channels such as wireless channels with line of sight, including cellular, cordless, etc.

The method assumes that the channel has at most L non zero taps located within an M-symbol long time interval. An initial channel estimate is then performed assuming an M-tap long channel impulse response. The initial channel estimate may be performed by any suitable linear method such as a least squares technique, etc. Note that L is less than M so as to ensure that the actual channel taps will be contained in the M estimated taps, thus yielding the actual channel impulse response taps for the equalizer. The channel estimate is performed during the transmission of each training sequence, which in cellular TDMA systems is every burst period.

The energy contained in the estimated channel taps is then calculated and then averaged with leakage. Averaging with leakage serves to track slow variations in the pattern of resultant channel taps. In addition, averaging of the energy, as opposed to the amplitude, is preferable since the average of the complex amplitudes or the channel taps may be zero. This is due to the fact the channel taps are represented as zero-mean, complex, Gaussian random processes.

Considering that the maximum number of taps is L, there must be at least M-L taps comprising noise only. The noise floor is thus calculated using the M-L lowest averaged taps. A threshold is computed as a function of the estimated noise floor. The channel order and the tap positions are then selected. The channel order and tap positions correspond to the number and position of average taps above the threshold, respectively.

Further, the values of the channel taps selected can be refined by recalculating the channel estimate using any suitable channel estimate technique, e.g., least squares method. Once an accurate channel estimate is obtained, the estimate is used by the equalizer in generating the equalized output.

There is thus provided in accordance with the present invention a method of estimating the order of a bounded length channel having a plurality of non zero taps located within a symbol time interval, the method comprising the steps of calculating an initial channel estimate using a channel length of M taps, calculating the energy of the taps of the initial channel estimate, averaging the tap energies over time, selecting a threshold in accordance with a noise floor calculated using the M-L taps having the lowest average energies, setting the channel order N to the number of taps above the threshold and wherein L, M and N are positive integers.

There is also provided in accordance with the present invention a method of calculating an estimate of a bounded length channel having at most L non zero taps located within an M symbol time interval, the method comprising the steps of calculating an initial channel estimate using a channel length of M taps, calculating the energy of the taps of the initial channel estimate, averaging the tap energies over time, selecting a threshold in accordance with a noise floor calculated using the M-L taps having the lowest average energies, selecting a number of taps N that are larger than the threshold, recalculating the value of the N channel taps and wherein L, M and N are positive integers.

There is further provided in accordance with the present invention a cellular radio receiver for receiving and decoding a transmitted cellular signal comprising a radio frequency (RF) receiver circuit for receiving and downconverting the transmitted cellular signal to a baseband signal, a demodulator adapted to demodulate the baseband signal in accordance with the modulation scheme used to generate the transmitted cellular signal, an equalizer comprising signal processing means programmed to calculate an estimate of a bounded length channel having at most L non zero taps located within an M symbol time interval, calculate an initial channel estimate using a channel length of M taps, calculate the energy of the taps of the initial channel estimate, average the tap energies over time, select a threshold in accordance with a noise floor calculated using the M-L taps having the lowest average energies, select a number of taps N that are larger than the threshold, recalculate the value of the N channel taps, a channel decoder adapted to decode the output of the equalizer so as to generate a decoded output data signal and wherein L, M and N are positive integers.

There is also provided in accordance with the present invention, in a communication receiver coupled to a bounded length channel, a method of estimating the order of said channel having a plurality of non zero taps located within a plurality of symbol time intervals, said method comprising the steps of calculating an initial channel estimate using a channel length comprising a first number of taps, averaging over time the energy of the initial channel estimate utilizing the first number of taps, selecting a threshold in accordance with a noise floor calculated using those taps corresponding to the lowest average energies and setting the channel order equal to the number of taps above the threshold.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| AMPS | Advanced Mobile Telephone System |
| ASIC | Application Specific Integrated Circuit |
| CDMA | Code Division Multiple Access |
| CIR | Channel Impulse Response |
| CPU | Central Processing Unit |
| CRC | Cyclic Redundancy Check |
| DFE | Decision Feedback Equalizer |
| DSP | Digital Signal Processor |
| EGPRS | Enhanced General Packet Radio System |
| FIR | Finite Impulse Response |
| FPGA | Field Programmable Gate Array |
| GMSK | Gaussian Minimum Shift Keying |
| GSM | Global System for Mobile Communication |
| ISI | Intersymbol Interference |
| MCS | Modulation Coding Scheme |
| MLSE | Maximum Likelihood Sequence Estimation |
| PSK | Phase Shift Keying |
| TACS | Total Access Communications Systems |
| TDMA | Time Division Multiple Access |
| WLAN | Wireless Local Area Network |
| WLL | Wireless Local Loop |

DETAILED DESCRIPTION OF THE INVENTION

The present invention is a method of channel order selection and channel estimation. The method of the present invention is particularly useful in communication systems characterized by dynamically changing channels such as wireless communications systems. Examples of wireless communications systems include cordless telephony and cellular communications systems. Examples of cellular communications systems include global systems for mobile communications (GSM), CDMA, TDMA, etc.

For illustration purposes, the invention is described in the context of a GSM mobile station. Note, however, that it is not intended that the invention be limited to the example presented herein. It is appreciated that one skilled in the art would be ale to apply the principles of the invention to other communications systems (wireless or not) as well.

Figure 3:
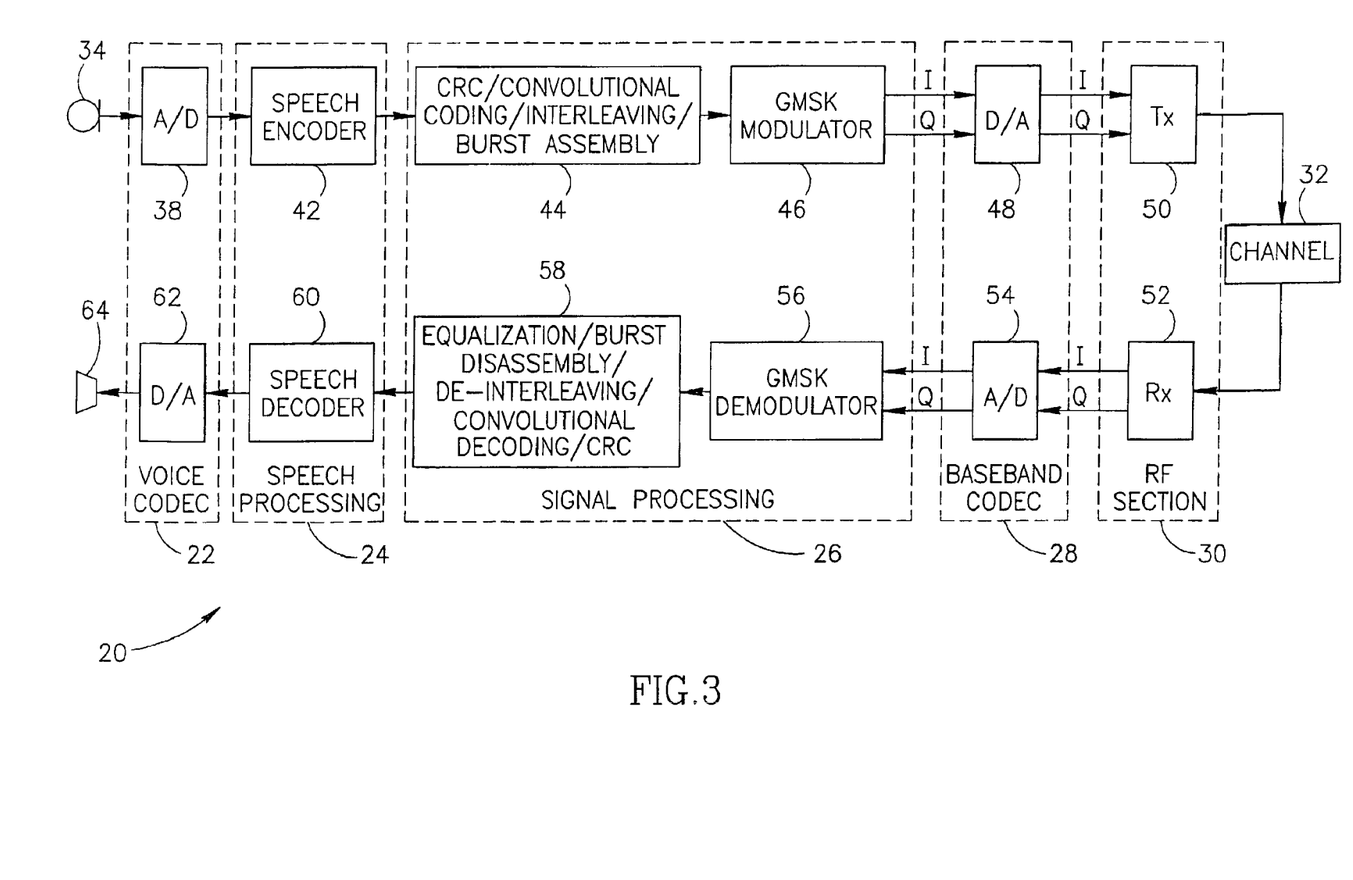
FIG. 3 is a block diagram illustrating the functional processing blocks in a GSM mobile station.

A GSM mobile station constructed to comprise means for performing the channel order selection and channel estimation method of the present invention is presented first followed by a detailed description of the method of the present invention. A block diagram illustrating the functional processing blocks in a GSM mobile station is shown in FIG. 3. The GSM mobile station, generally referenced 20, comprises a microphone 34, speaker 64, voice codec 22, speech processing circuitry 24, signal processing circuitry 26, baseband codec 28 and RF circuitry section 30.

The voice codec 22 is adapted to perform the conversion between the analog speech signals and the digital processing circuitry of the phone. The codec comprises (1) an analog to digital converter for converting the analog signal generated by the microphone 34 to digital format for input to the speech processing circuitry 24 and (2) a digital to analog converter for recovering the analog signal output to the speaker 64. The voice codec also comprises low pass filtering for anti-aliasing in the transmit path and for waveform reconstruction in the receive path. Amplifiers in the voice codec amplify the signal received from the microphone and the signal output to the speaker.

The speech processor (or codec) compresses the 13 bit signal at 8 kHz resolution, yielding a total of 104 kbps, from the voice codec into 13 kbps by reducing redundant information. In the receive direction, the codec expands the compressed digital signal from the base station into a higher bit rate speech signal.

In the transmit direction, the signal processing portion 26 functions to protect the data so as to provide reliable communications over the channel. Several processes performed by channel coding block 44 are use to protect the data including cyclic redundancy check (CRC), convolutional coding and interleaving. The resultant data is assembled into bursts whereby guard and tail bits are added in addition to a training sequence midamble that is added to the middle of the burst. Note that both the user data (i.e. voice data) and the signaling information go through similar processing. The assembled burst is then differentially encoded and modulated by a Gaussian Minimum Shift Keying (GMSK) modulator 46.

In the receive direction, the output of the baseband codec is demodulated using GMSK demodulator 56. Several processes performed by channel decoding block 26 are then applied to the demodulated output. The processes performed include equalization, burst disassembly, de-interleaving, convolutional decoding and CRC.

The baseband codec 28 converts the transmit and receive data into analog and digital signals, respectively via D/A converter 48 and A/D converter 54. The transmit D/A converter provides analog baseband I and Q signals to the transmitter 50 in the RF section 30. The I and Q signals are used to modulate the carrier for transmission over the channel 32. In the receive direction, the analog I and Q signals output from the receiver 52 are converted back into a digital data stream. This digital data stream is filtered and demodulated before it is input to the equalizer.

In addition, the mobile station performs other functions that may be considered higher level such as synchronization, frequency and time acquisition and tracking, monitoring, measurements of received signal strength and control of the radio. Additional functions include handling the user interface, signaling between the mobile station and the network, the SIM interface, etc.

GSM Baseband Processing

Figure 4:
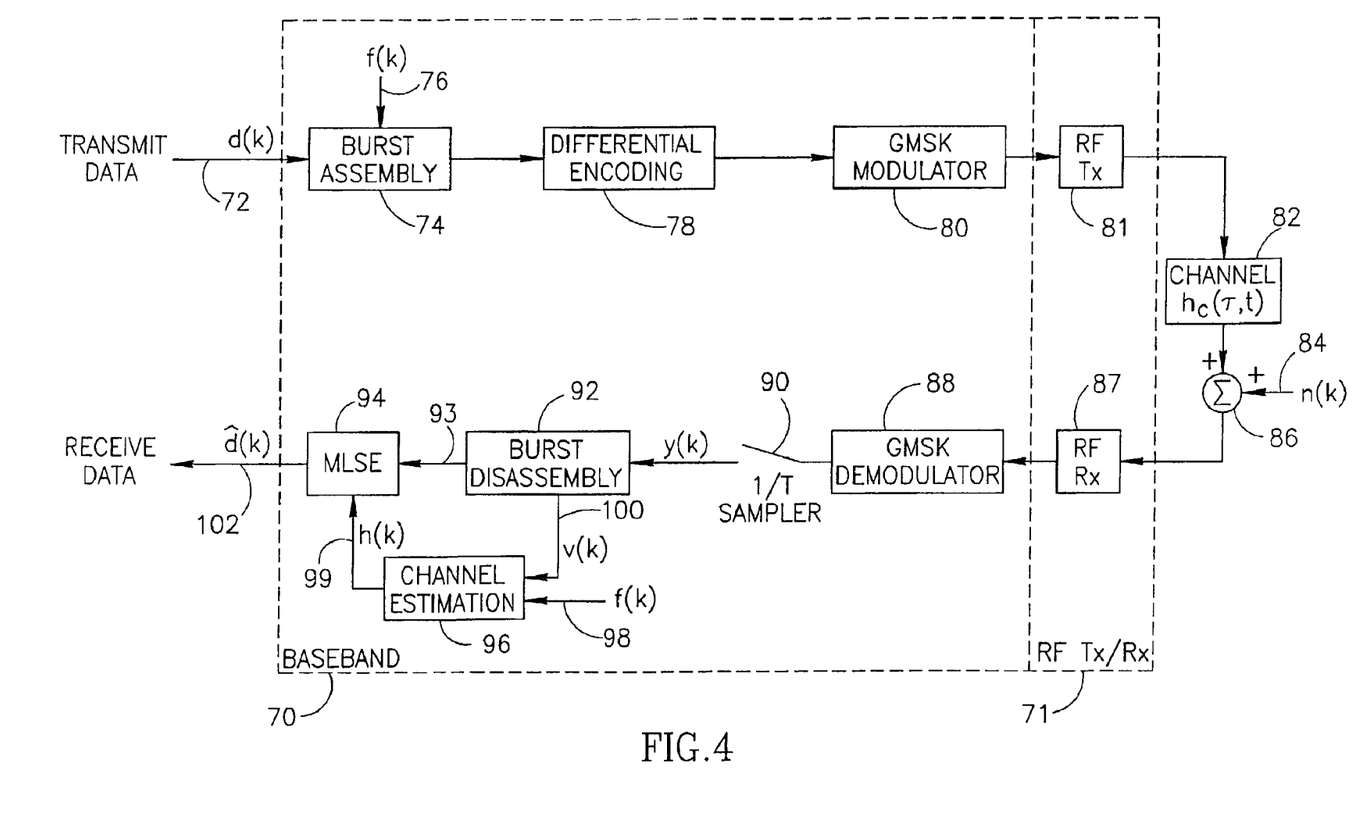
FIG. 4 is a block diagram illustrating a portion of the RF and baseband signal processing blocks of a GSM mobile station in more detail.

A block diagram illustrating a portion of the RF and baseband signal processing blocks of a GSM mobile station in more detail is shown in FIG. 4. The portion of the baseband processing circuitry illustrated, generally referenced 70, comprises burst assembly 74, differential encoding 78, GMSK modulator 80, GMSK demodulator 88, sampler 90, burst disassembly 92, channel estimation 96 and maximum likelihood sequence estimation (MLSE) 94. The RF portion, generally referenced 71 comprises RF transmitter 81 and RF receiver 87.

In operation, coded transmit data bits d(k) 72 together with trailing sequence bits f(k) 76 and tail bits are assembled into bursts of 142 hits by burst assembler 74. Each bit period T has a duration of approximately 3.7 microseconds. The data is differentially encoded by encoder 78 before being modulated using Gaussian Minimum Shift Keying (GMSK) modulation by modulator 80. The modulated signal is input the RF transmitter 81 and output onto the wireless channel 82 which is represented by $h_c(\tau, t)$. Additive Gaussian noise is represented as noise sequence n(k) 84 which corrupts each received burst and is modeled by adder 86. The resultant composite signal is downconverted by the RF receiver circuitry 87 and input to the GMSK demodulator 88.

In accordance with the Boss reference cited hereinabove, the impulse response of the channel including the receive filter can be expressed as the following.

$$h_c(\tau, t) = \frac{1}{\sqrt{N_e}} \sum_{v=1}^{N_e} e^{j(2\pi f_{d,v} t + \Theta_v)} \cdot g_{R_e}(\tau - \tau_v) \quad (1)$$

where $h_c(\cdot)$ represents the time variant impulse response of the channel including the receive filter;

$N_e$ is the number of elementary echo paths;

$g_{R_c}(\tau)$ represents the receive filter finite impulse response;

$f_{d,v}$ represents Doppler frequencies;

$\Theta_v$ represents initial phase;

$\tau_v$ represents echo delay time;

The output of the demodulator 88 is sampled by sampler 90 at a rate 1/T so as to generate a stream of samples y(k). The samples making up the burst are then disassembled by burst diassembler 92 which functions to split the received samples into a data portion and a training sequence portion. The data portion 93 is input to the maximum likelihood sequence estimator (MLSE) 94 while the training sequence portion is input to the channel estimation block 96. A training sequence f(k) 98 stored in memory is also input to the channel estimation as a reference sequence. The estimate of the channel h(k) 99 is then input to the MLSE 94.

Many GSM implementations employ a type nonlinear, maximum likelihood sequence estimation (MLSE), soft output equalizer known as a Viterbi equalizer. The MLSE 94 (or Viterbi equalizer) is operative to remove the intersymbol interference from the received communication signal y(k) and to generate the received data â(k). The MLSE process, however, assumes that the channel is linear with a known finite impulse response. Knowledge of the impulse response of the channel is estimated from the training sequences that the transmitter sends to the receiver as the midamble of each burst. The midamble in a normal burst comprises the 26 innermost symbols making up one of eight possible training sequences.

In operation, the Viterbi equalizer is adapted to perform the Viterbi algorithm and, in particular, efficiently searches through possible sequences of data that could have been transmitted. The receiver input corresponding to each transmitted sequence is calculated and compared to the actual receiver input. The sequence yielding the highest probability of having been transmitted is selected.

The so called channel estimate, however, requires knowledge of the channel order. Thus, before a channel estimate can be performed, the order of the channel (i.e. number or taps of the impulse response function used to model the channel) must be selected. The present invention provides such a method. The method of the present invention is operative to determine the number of channel laps in the FIR filter used to model the channel and to determine their respective values.

Channel Estimation

Figure 5:
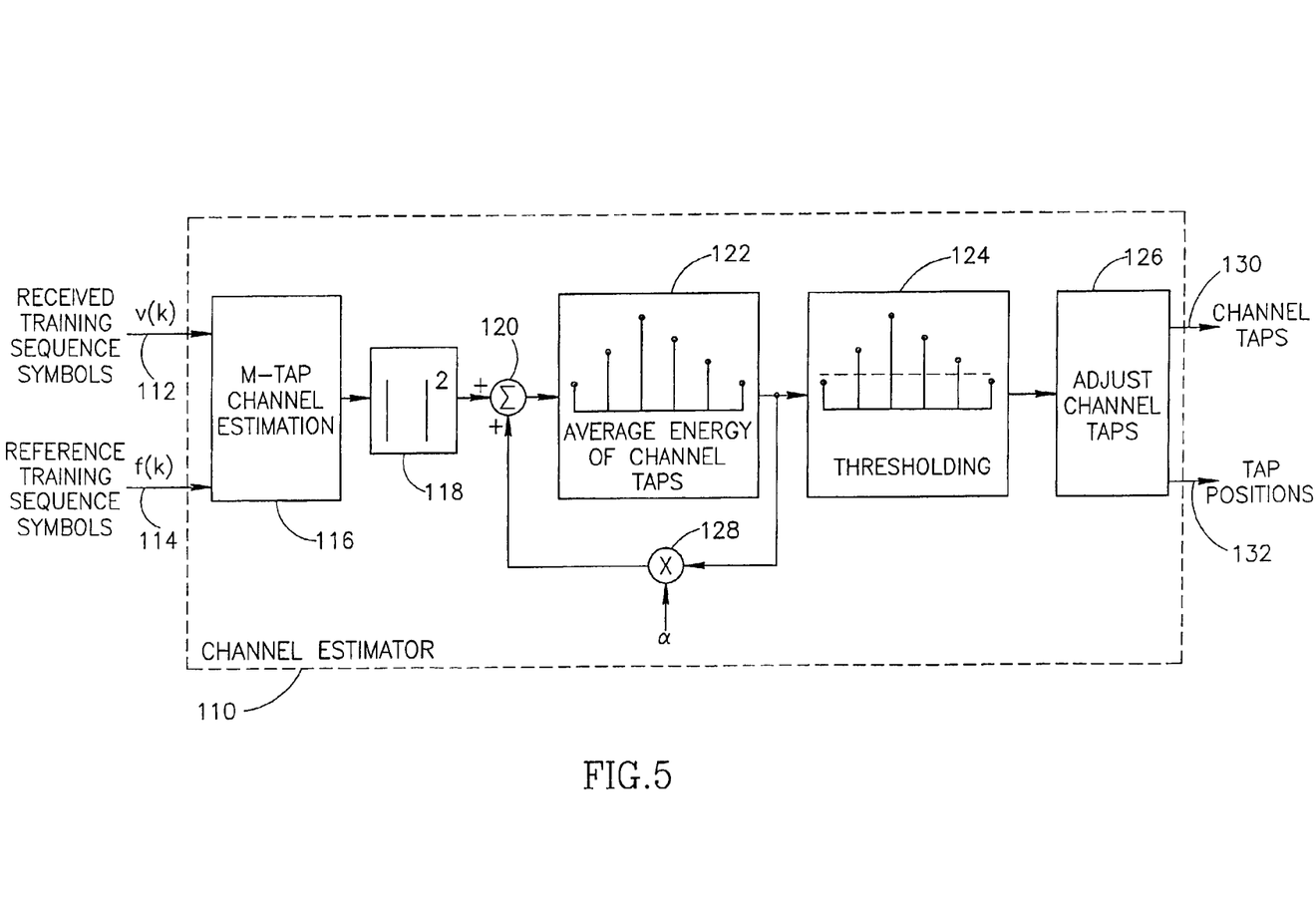
FIG. 5 is a block diagram illustrating a channel estimator constructed in accordance with the present invention.

A block diagram illustrating a channel estimator constructed in accordance with the present invention shown in FIG. 5. The channel estimator, generally referenced 110, is preferably implemented in the channel estimation block 96 (FIG. 4). Note, however, that the channel order selection method and apparatus of the present invention is not limited to the example presented herein and may be implemented by one skilled in the signal processing arts in other types of communication systems (wired or wireless) as well. In addition, the method and apparatus presented herein may be implemented using any suitable technique known in the art such as (1) software or firmware running on a digital signal processor (DSP), (2) software or firmware running on a general purpose microprocessor or CPU or (3) as hardware circuitry in an ASIC, FPGA, custom integrated circuit, etc.

First, a description and way of representing the channel is presented. The wireless channel can be represented by a T-spaced equivalent model expressed as $$y(n) = \sum_{k \in D} h(k) d(n-k) + v(k) \quad (2)$$

where y(n) represents the received samples;

h(k) represents the channel taps;

v(k) represents white, zero mean, complex Gaussian noise;

d(k) represents the data symbols $D = \{k_1, \ldots, k_N : L \geq N, M \geq k_N - k_1 + 1\}$ (i.e. the channel has at most L taps and its time spread can be up to M symbols).

The equivalent channel taps h(k) represents the common impulse response of the shaping transmit filter, the actual channel and the receive filter. The taps of the channel can be represented as zero-mean Gaussian random processes. It is noted that h(k) and v(k) are independent processes.

An M-tap channel estimation 116 is performed using the received signal corresponding to training sequence symbols 112 and the previously stored reference training sequence symbols f(k) 114. It is assumed that the channel is a discrete time channel comprising a maximum of L taps. The initial channel estimate performed comprises M taps wherein L<M. A channel estimate using a number of taps larger than the maximum of the channel ensures that the actual channel taps will be among the M estimated taps, thus ensuring operation substantially free of intersymbol interference. The channel estimation is performed each burst using the received training sequence.

In accordance with the invention, the channel estimate may be performed using any suitable linear method such as a least squares technique, correlation method, etc. The least squares technique is described in more detail in the Haykin, Khayrallah and Boss references cited hereinabove.

If the channel estimate is performed using a linear method such as least squares, the estimation can be written in matrix form as follows $$\hat{\underline{h}} = H\underline{y} \quad (3)$$

where $\hat{\underline{h}}$ is the channel estimate vector having dimension M×1;

$\underline{y}$ represents the input sample vector having dimension K×1;

H is the least squares estimation result having dimensions M×K;

In the case of an unbiased estimate, $$\hat{\underline{h}} = \underline{h} + \underline{n} \quad (4)$$

where $\underline{h}$ represents the actual channel response;

$\underline{n}$ represents the noise vector.

The $R_{\eta\eta}$ and $\underline{\eta}$ covariance matrices can be expressed using Equation 3 as follows $$R_{\eta\eta} = E[\underline{\eta}\underline{\eta}^H] \quad (5)$$
$$= E[H\underline{v}\underline{v}^H H^H]$$
$$= HR_{vv}H^H$$
$$= N_0 HH^H$$

where $N_0$ represents the one sided spectral density of the noise;

$R_{vv}$ is the covariance matrix of the input noise v(k), and $R_{vv}=N_0 I$ where I is the entity matrix;

α represents the weighting factor to be applied each averaging cycle.

The average energy of the channel taps 122 is calculated by the addition (using adder 120) of the previous average energy calculation multiplied by a leakage factor α (using multiplier 128) with the current taps' average energy as it appears at the output of block 118. The averaged tap energy appears the output of adder 120.

Assuming stationarity (i.e. static measurements taken at different times yield similar results), the mean of the average energy can be expressed as follows $$(1-\alpha)E[\langle|\hat{h}|^2\rangle] = E[|\hat{h}|^2] \quad (7)$$
$$= diag\{R_{hh}\} + diag\{R_{\eta\eta}\}$$
$$= diag\{R_{hh}\} + N_0 diag\{HH^H\}$$

where the <> operator denotes the average.

This expression can be written in terms of noise and channel covariance matrices $$E[\langle|\hat{h}|^2\rangle] = \alpha E[\langle|\hat{h}|^2\rangle] + E[|\hat{h}|^2] \quad (6)$$

where diag$\{R_{hh}\}$ represents the mean energy of the channel taps.

In the typical case, the main diagonal of the $HH^H$ matrix has equal or nearly equal tap values. Therefore, all the averaged taps comprise substantially the same noise component. Moreover, since the channel has a maximum of L taps, at least M-L taps comprise the noise component only. Thus, these M-L taps will have the lowest average energy values since they comprise noise only. The M-L lowest averaged taps can be used to estimate the noise floor. A threshold is then selected in accordance with the estimated noise floor (block 124). The channel order is selected by comparing each tap to the threshold. The number of taps above the threshold make up the channel order.

Further, considering only those channel taps larger than the threshold, the values of the channel taps themselves 130 and the positions of the taps 132. The number of channel estimate using channel order just determined. The output of the tap adjustor comprises the channel taps themselves 130 and the positions of the taps 132. The number of channel taps comprises the channel order.

Figure 6:
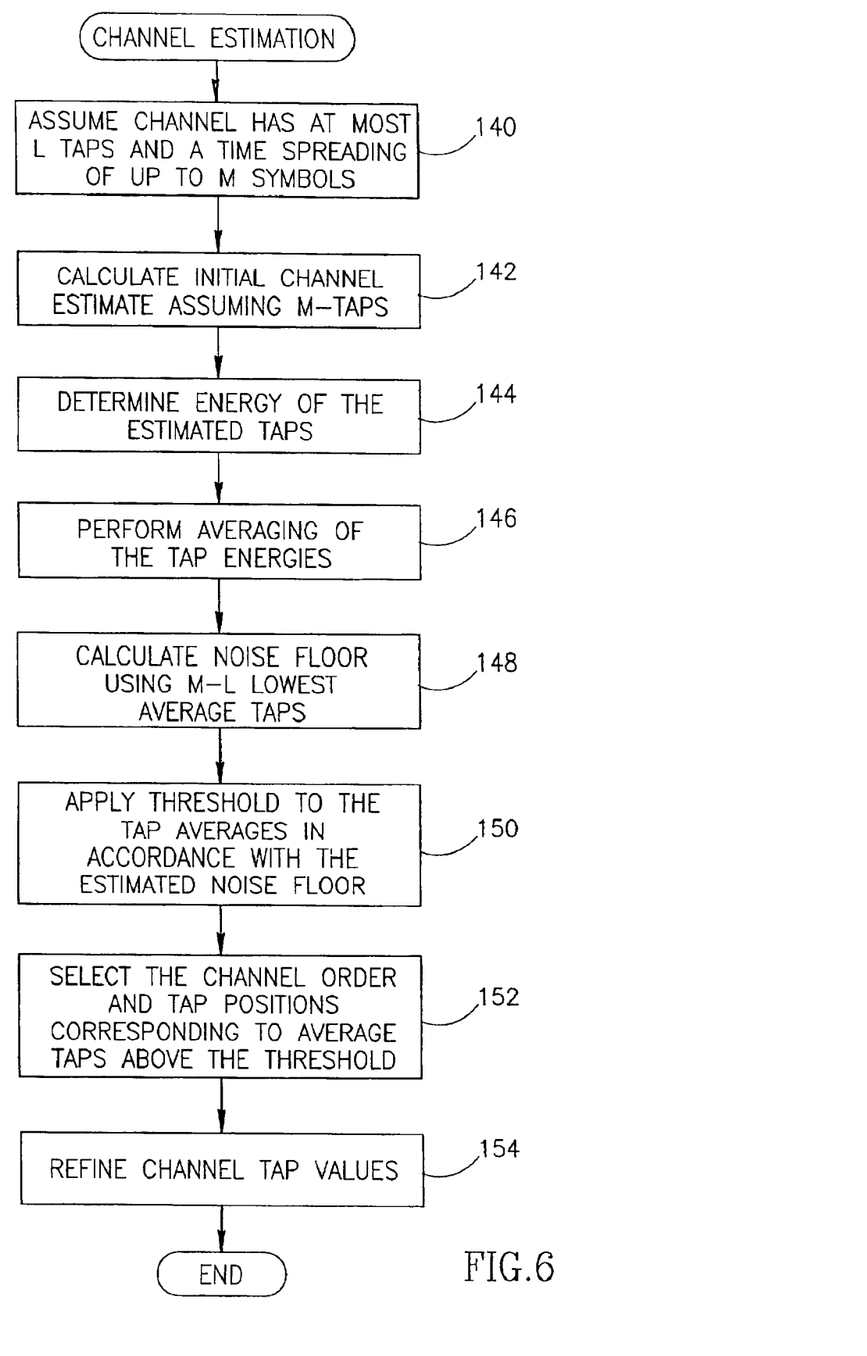
FIG. 6 is a flow diagram illustrating the channel estimation method of the present invention.

A flow diagram illustrating the channel estimation method of the present invention is shown in FIG. 6. As described previously, the method assumes that the channel has at most L taps and a time spreading of up to M symbols (step 140). An initial channel estimate is then performed assuming, an M-tap long channel impulse response (step 142). The initial channel estimate may be performed using any suitable linear method such as a least squares technique, correlation method, etc. Note that L is less than M so as to ensure that the actual channel taps will be contained in the M estimated taps thus making certain that the equalizer will effectively eliminate intersymbol interference. The channel estimate is performed during each burst using the training sequence transmitted in the middle of the burst and the stored reference training sequence.

The energy contained in the estimated channel taps is then calculated (step 144) and then averaged with leakage (step 146). Averaging with leakage serves to track slow variations in the pattern of resultant channel taps. In addition, averaging or the energy (as opposed to amplitude) is preferable since the average of the amplitude of the channel taps is zero. This is due to the fact the channel taps are represented as zero-mean, complex, Gaussian random processes.

Considering that the maximum number of taps is L, there must be at least M-L taps comprising noise only. The noise floor is thus calculated using the M-L lowest averaged taps (step 148). A threshold is computed as a function of the M-L lowest averaged taps and this threshold is applied to the average taps in accordance with the estimated noise floor (step 150). The channel order and the tap positions are then selected (step 152). The channel order and tap positions correspond to the number and position of average taps above the threshold, respectively.

Further, the values of the channel taps selected can be refined by recalculating the channel estimate using any suitable channel estimate technique, e.g., least squares method (step 154). Once an accurate channel estimate is obtained, the estimate is used by the Viterbi equalizer in generating the equalized output.

Simulation Results

To illustrate the benefits of the channel order selection method of the present invention, a GSM Enhanced General Packet Radio System (EGPRS) was simulated and the results are presented herein. The simulation was performed assuming the MCS5 coding scheme, a typical urban channel for a mobile unit moving at a velocity of 50 km/h (TU50) and a 900 MHz frequency band.

The EGPRS system is a Time Division Multiple Access (TDMA) system wherein eight users are able to share the same carrier frequency. In an EGPRS transmitter, the data bits are encoded with a rate 1/3 convolutional encoder, interleaved and mapped to 8-ary symbols. The resultant coded data symbols together with the training sequence are assembled into a burst of 142 symbols as shown in FIG. 2.

The burst is then modulated using 3π/8-offset 8-PSK with Gaussian pulse shaping in accordance with the GSM standard. The modulated output is transmitted over a frequency selective Gaussian fading channel as described above. An MLSE type equalizer with a Least Squares type channel estimator was used in the receiver.

The receiver was adapted to perform the channel order selection of the present invention. The channel order selection method was implemented using a leakage factor α=0.9 (see Equation 6), time spreading M=11 and number of taps L=7. Note that a seven tap long channel is sufficient for most GSM scenarios according to Mehrotra. The results of the simulation are presented in FIGS. 7 through 10.

Figure 7:
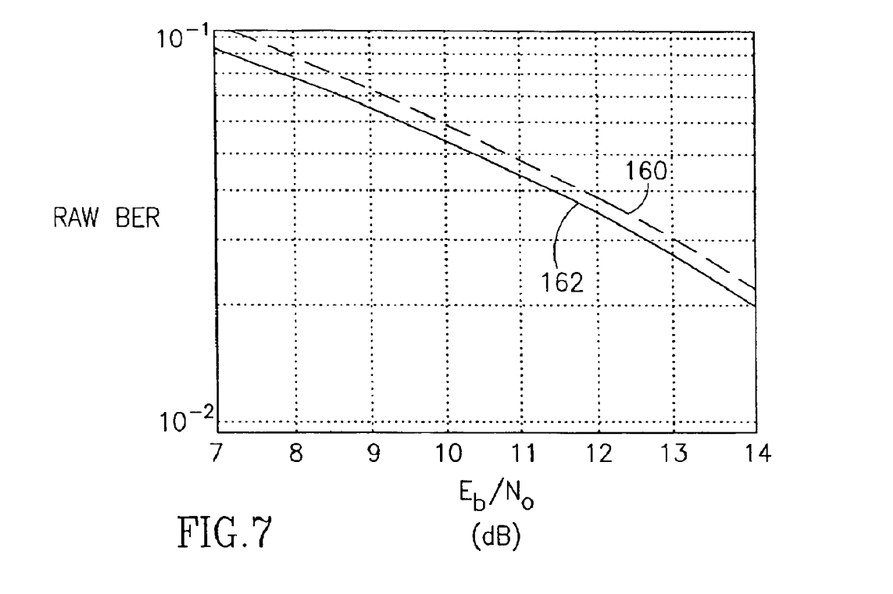
FIG. 7 is a graph illustrating raw BER at the output of the Viterbi equalizer versus SNR for a fixed order channel and adaptive order selection in accordance with the present invention.

A graph illustrating raw BER at the output of the equalizer versus SNR for a fixed order channel and adaptive order selection in accordance with the present invention is shown in FIG. 7. The dashed curve 160 represents the raw BER at the output of the equalizer versus SNR for a channel having a fixed order of seven taps. The solid curve 162 represents the raw BER versus SNR resulting from the use of the adaptive channel order selection method of the present invention.

Figure 8:
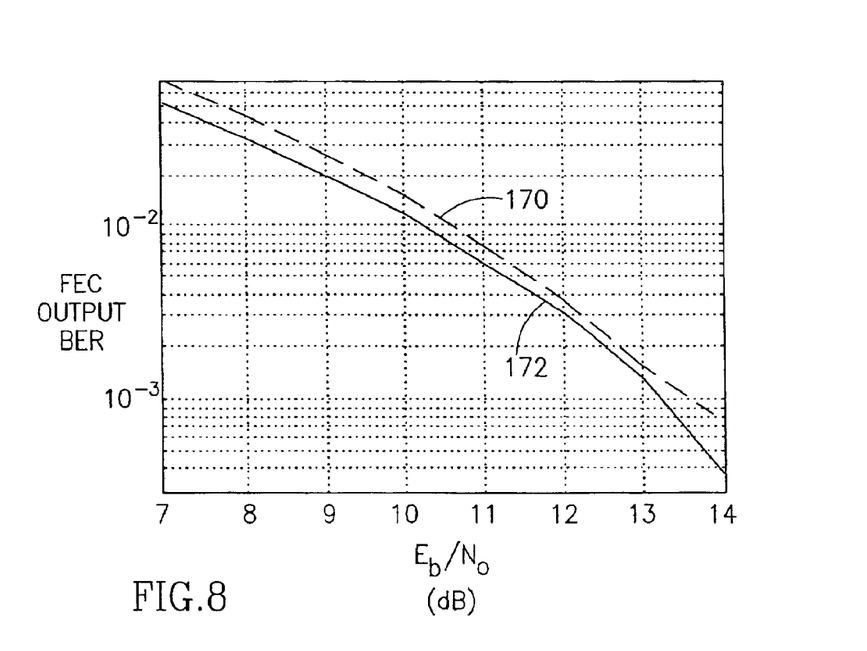
FIG. 8 is a graph illustrating BER at the output of the decoder versus SNR for a fixed order channel and adaptive order selection in accordance with the present invention.

A graph illustrating BER at the output of the decoder versus SNR for a fixed order channel and adaptive order selection in accordance with the present invention is shown in FIG. 8. The dashed curve 170 represents the BER at the output of the FEC decoder versus SNR for a fixed order channel of seven taps. The solid curve 172 represents the BER at the output of the FEC decoder using the adaptive channel order selection method of the present invention.

Figure 9:
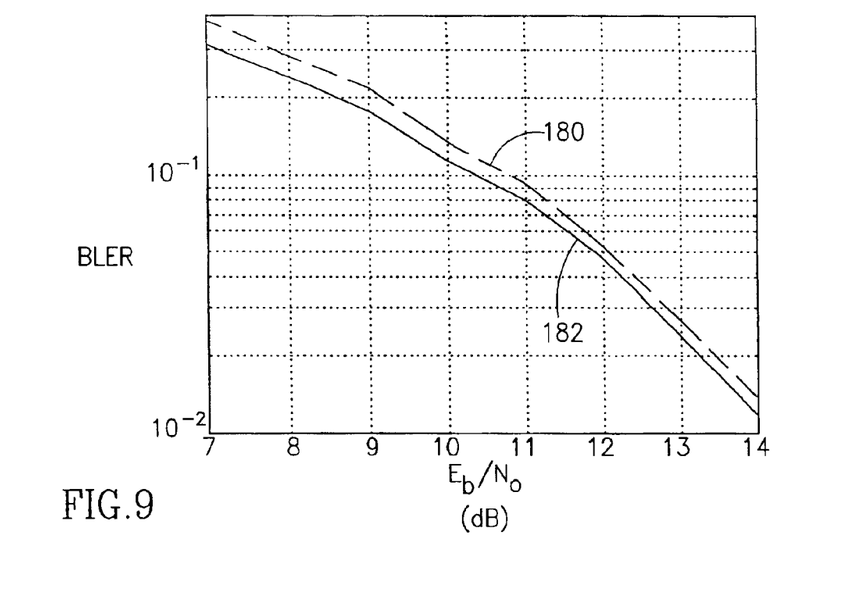
FIG. 9 is a graph illustrating block error rate versus SNR for a fixed order channel and adaptive order selection in accordance with the present invention.

A graph illustrating block error rate versus SNR for a fixed order channel and adaptive order selection in accordance with the present invention is shown in FIG. 9. The dashed curve 180 represents the block error rate, which is the probability of an interleaver block being corrupted, for a fixed channel order having seven taps. The solid curve 182 represents the block error rate using the adaptive channel order selection method of the present invention.

As can be seen in FIGS. 7, 8, 9, the adaptive channel order selection method of the present invention yields at least a ½ dB performance improvement in BER at relatively low SNRs. At higher SNRs, the improvement in BER can be 1.25 dB and higher.

Figure 10:
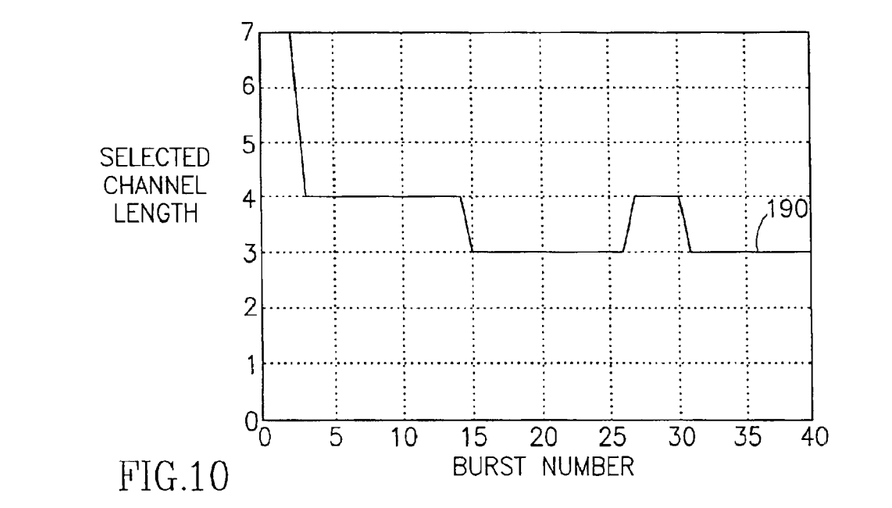
FIG. 10 is a graph illustrating the dynamic selection of channel length versus time.

A graph illustrating the dynamic selection of channel length versus time is shown in FIG. 10. The curve 190 represents the channel order as selected by the method of the present invention. The time scale is represented by the number of GSM bursts. As indicated by the curve, the method dynamically adapts to the changing SNR conditions of the channel. In addition, as shown by the curve, the method exhibits relatively fast acquisition time, converging by the third burst. Once in the steady state, the method is operative to select channels having a length of either three or four taps.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of estimating channel order of a bounded length channel having at most L non zero taps located within an M symbol time interval, said method comprising the steps of:
   calculating a channel estimate over a plurality of bursts using a channel length of M taps to yield estimated channel taps;
   calculating tap energies of said estimated channel taps;
   averaging said tap energies over time to generate average tap energies;
   selecting a threshold in accordance with a noise floor estimate calculated using the lowest M-L average tap energies;
   setting said channel order to a number of average tap energies N above said threshold; and
   wherein L, M and N are positive integers.

2. The method according to claim 1, wherein said step of calculating said channel estimate is performed using a least squares technique.

3. The method according to claim 1, wherein said step of calculating said channel estimate is performed using a correlation technique.

4. The method according to claim 1, wherein said estimated channel taps are represented as zero-mean, complex, Gaussian random processes.

5. The method according to claim 1, wherein said estimated channel taps are represented as non zero-mean, complex, Gaussian random processes.

6. The method according to claim 1, wherein said estimated channel taps vary over time.

7. The method according to claim 1, further comprising the step of refining said estimated channel taps by recalculating said channel estimate utilizing said channel order.

8. A method of calculating an estimate of a bounded length channel having at most L non zero taps located within M symbol time intervals, said method comprising the steps of:
   calculating a channel estimate over a plurality of bursts using a channel length of M taps to yield estimated channel taps;
   calculating tap energies of said estimated channel taps;
   averaging said tap energies over time to generate average tap energies;
   selecting a threshold in accordance with a noise floor estimate calculated using the lowest M-L average tap energies;
   setting a channel order to a number of average tap energies N that are above said threshold;
   refining said estimated channel taps by recalculating the channel estimate utilizing said channel order; and
   wherein L, M and N are positive integers.

9. The method according to claim 8, wherein said step of calculating said channel estimate is performed using a least squares technique.

10. The method according to claim 8, wherein said step of calculating said channel estimate is performed using correlation technique.

11. The method according to claim 8, wherein said estimate channel taps are represented as zero-mean, complex, Gaussian random processes.

12. The method according to claim 8, wherein said estimated channel taps are represented as non zero-mean, complex, Gaussian random processes.

13. The method according to claim 8, wherein said estimated channel taps vary over time.

14. A cellular radio receiver for receiving and decoding a transmitted cellular signal, comprising:
   a radio frequency (RF) receiver circuit for receiving and downconverting said transmitted cellular signal to a baseband signal;
   a demodulator adapted to demodulate said baseband signal in accordance with the modulation scheme used to generate said transmitted cellular signal;
   an equalizer comprising signal processing means programmed to:
      estimate a channel order of a bounded length channel having at most L non zero taps located within an M symbol time interval;
      calculate a channel estimate over a plurality of bursts using a channel length of M taps to yield estimated channel taps;
      calculate tap energies of said estimated channel taps;
      average said tap energies over time to generate average tap energies;

select a threshold in accordance with a noise floor estimate calculated using the lowest M-L average tap energies;

set said channel order to a number of average tap energies N that are above said threshold;

a channel decoder adapted to decode the output of said equalizer to generate a decoded output data signal; and wherein L, M and N are positive integers.

15. The receiver according to claim 14, further comprising a speech decoder operative to convert said decoded output data signal to an audible speech signal.

16. The receiver according to claim 14, wherein said signal processing means is programmed to further refine said estimated channel taps by recalculating said channel estimate utilizing said channel order.

17. The receiver according to claim 14, wherein said equalizer is adapted to calculate said channel estimate utilizing a least squares technique.

18. The receiver according to claim 14, wherein said equalizer is adapted to calculate said channel estimate utilizing a correlation technique.

19. The receiver according to claim 14, wherein said estimated channel taps are represented as zero-means, complex, Gaussian random processes.

20. The receiver according to claim 14, wherein said estimated channel taps are represented as non zero-mean, complex, Gaussian random processes.

21. The receiver according to claim 14, wherein said estimated channel taps vary over time.

22. The receiver according to claim 14, wherein said equalizer comprises means for performing a maximum likelihood sequence estimation (MLSE) technique.

23. The receiver according to claim 14, wherein said equalizer comprises means for performing a sub-optimal complexity reduced maximum likelihood sequence estimation (MLSE) technique.

24. The receiver according to claim 14, wherein said equalizer comprises means for performing a decision feedback equalization (DFE) technique.

25. The receiver according to claim 14, wherein said receiver is adapted to receive and decode a global system for mobile communications (GSM) cellular signal.

26. In a communications receiver coupled to a bounded length channel having a plurality of non zero taps located within a plurality of symbol time intervals, a method of estimating channel order, said method comprising the steps of:

calculating a channel estimate over a plurality of bursts using a channel length comprising a first number taps to yield estimated channel taps;

averaging over time tap energies of said tap estimated channel taps to generate average tap energies;

selecting a threshold in accordance with a noise floor estimate calculated using a predetermined number of the lowest average tap energies; and setting said channel order to a number of average tap energies above said threshold.

27. The method according to claim 26, wherein said step of calculating said channel estimate is performed using a least squares technique.

28. The method according to claim 26, wherein said step of calculating said channel estimate is performed using a correlation technique.

29. The method according to claim 26, wherein said estimated channel taps are represented as zero-mean, complex, Gaussian random processes.

30. The method according to claim 26, wherein said estimated channel taps are represented as non zero-mean, complex, Gaussian random processes.

31. The method according to claim 26, wherein said estimated channel taps vary over time.

32. A computer readable storage medium having a computer program embedded therein for causing a suitably programmed system to estimate the order of a channel having a plurality of non zero taps located within a plurality of symbol time intervals, by performing the following steps when said computer program is executed on said system:

calculating a channel estimate over a plurality of bursts using a channel length comprising a first number taps to yield estimated channel taps;

averaging tap energies over time, said tap energies determined from said channel taps;

selecting a threshold in accordance with a noise floor estimate calculated using a second number of lowest average tap energies; and setting said channel order to a number of average tap energies above said threshold.

* * * * *